(12) United States Patent
Chun et al.

(10) Patent No.: US 9,734,073 B2
(45) Date of Patent: Aug. 15, 2017

(54) SYSTEM AND METHOD FOR FLASH READ CACHE WITH ADAPTIVE PRE-FETCH

(71) Applicant: QUALCOMM INCORPORATED, San Diego, CA (US)

(72) Inventors: Dexter Tamio Chun, San Diego, CA (US); Yanru Li, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/929,083

(22) Filed: Oct. 30, 2015

(65) Prior Publication Data

US 2017/0123988 A1    May 4, 2017

(51) Int. Cl.
    G06F 12/00     (2006.01)
    G06F 12/0862   (2016.01)
    G06F 12/0804   (2016.01)

(52) U.S. Cl.
    CPC ...... *G06F 12/0862* (2013.01); *G06F 12/0804* (2013.01); *G06F 2212/7203* (2013.01)

(58) Field of Classification Search
    CPC .. G06F 12/00; G06F 12/0238; G06F 12/0246; G06F 3/0679
    USPC ................................ 711/100, 103, 154, 200
    See application file for complete search history.

(56) References Cited

U.S. PATENT DOCUMENTS

| | | | |
|---|---|---|---|
| 7,702,857 B2 | 4/2010 | Gill et al. | |
| 8,291,171 B2 * | 10/2012 | Rallens ............... | G06F 12/0862 711/118 |
| 8,713,260 B2 | 4/2014 | Taha et al. | |
| 2004/0123043 A1 | 6/2004 | Rotithor et al. | |
| 2004/0205298 A1 | 10/2004 | Bearden et al. | |
| 2008/0086600 A1 | 4/2008 | Qiao | |
| 2008/0229071 A1 | 9/2008 | Shioya et al. | |
| 2014/0297940 A1 * | 10/2014 | Kobayashi .......... | G06F 12/0866 711/113 |
| 2015/0178207 A1 | 6/2015 | Susarla et al. | |

FOREIGN PATENT DOCUMENTS

| | | |
|---|---|---|
| CN | 101634970 B | 9/2011 |
| EP | 1280063 A2 | 1/2003 |

OTHER PUBLICATIONS

Yang Liu et al., Journal of Networks FLAP: Flash-aware Prefetching for Improving SSD-based Disk Cache; Oct. 2014; vol. 9, Issue 10, pp. 2766-2774.
International Search Report and Written Opinion—PCT/US2016/054537—ISA/EPO—dated Jan. 23, 2017.

* cited by examiner

*Primary Examiner* — Tuan Thai
(74) *Attorney, Agent, or Firm* — Smith Tempel Blaha LLC

(57) ABSTRACT

Systems and methods for improved flash memory performance in a portable computing device are presented. In a method, a value N corresponding to an amount of prefetch data to be retrieved from the flash memory is determined. An access request for a flash memory is received at a cache controller in communication with a cache memory. A determination is made whether the access request for the flash memory corresponds to a portion of data stored in the cache memory. If the access request for the flash memory corresponds to the portion of data, the portion of data is returned in response to the access request. Otherwise, an N amount of prefetch data is retrieved from the flash memory and stored in the cache memory. The value N is incremented based on a cache hit percentage for the cache memory.

26 Claims, 8 Drawing Sheets

SYSTEM AND METHOD FOR FLASH READ CACHE WITH ADAPTIVE PRE-FETCH

DESCRIPTION OF THE RELATED ART

Mobile devices with a processor that communicate with other devices through a variety of communication media, including wireless signals, are ubiquitous. Mobile devices including portable computing devices (PCDs) may be used to communicate with a variety of other devices via wireless, analog, digital and other means. These mobile devices may include mobile cellular telephones, portable digital assistants (PDAs), portable game consoles, palmtop computers, laptop or tablet computers, wearable devices, and other portable electronic devices. In addition to the primary function, PCDs may also be used for downloading and playing games; downloading and playing music; downloading and viewing video; global positioning system (GPS) navigation, web browsing, and running various applications.

To accommodate the increased functionality, modern PCDs typically include increasing amounts of memory, including non-volatile memories such as NAND flash memories which may be used in conjunction with a PCDs' main dynamic random access memory (DRAM), including using Flash memory as a virtual memory to augment the PCDs' DRAM. However, reading and writing from such flash memories may be more time consuming than reading and writing other memories on the PCD, especially in PCDs implementing lower cost flash memories such as embedded multimedia card (eMMC) flash memories.

Thus, there is a need for systems and methods to improve the performance of such flash memories in PCDs.

SUMMARY OF THE DISCLOSURE

Systems and methods are disclosed that allow for improved flash memory performance by implementing a flash memory read cache with adaptive prefetching in a portable computing device (PCD). In operation, an exemplary method determines a value N corresponding to an amount of prefetch data to be retrieved from the flash memory is determined. An access request for a flash memory is received at a cache controller in communication with a cache memory. A determination is then made whether the access request for the flash memory corresponds to a portion of data stored in the cache memory. If the access request for the flash memory corresponds to the portion of data, the portion of data is returned in response to the access request. Otherwise, an N amount of prefetch data is retrieved from the flash memory and stored in the cache memory. The value N is incremented based on a cache hit percentage for the cache memory.

Another example embodiment is a computer system for a system-on-a-chip (SoC) in a portable computing device (PCD), the system comprising: a cache controller of the SoC; a cache memory in communication with cache controller; and a flash memory in communication with the cache controller. The cache controller is configured to: determine a value N corresponding to corresponding to an amount of prefetch data to be retrieved from the flash memory; receive from another component of the SoC an access request for a flash memory; determine whether the access request for the flash memory corresponds to a portion of data stored in the cache memory; return the portion of data stored in the cache memory in response to the request to access the flash memory if the access request for the flash memory corresponds to the portion of data stored in the cache memory; retrieve an N amount of prefetch data from the flash memory and store the N amount of prefetch data in the cache memory if the access request for the flash memory does not correspond to the portion of data stored in the cache memory; and increment the value N based on a cache hit percentage for the cache memory.

BRIEF DESCRIPTION OF THE DRAWINGS

In the drawings, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral to encompass all parts having the same reference numeral in all figures. Similarly, for reference numerals with 'designations, such as 102', the 'designation may designate an alternative embodiment for the underlying element with the same reference numerals (but without the 'designation).

DETAILED DESCRIPTION

Figure 1:
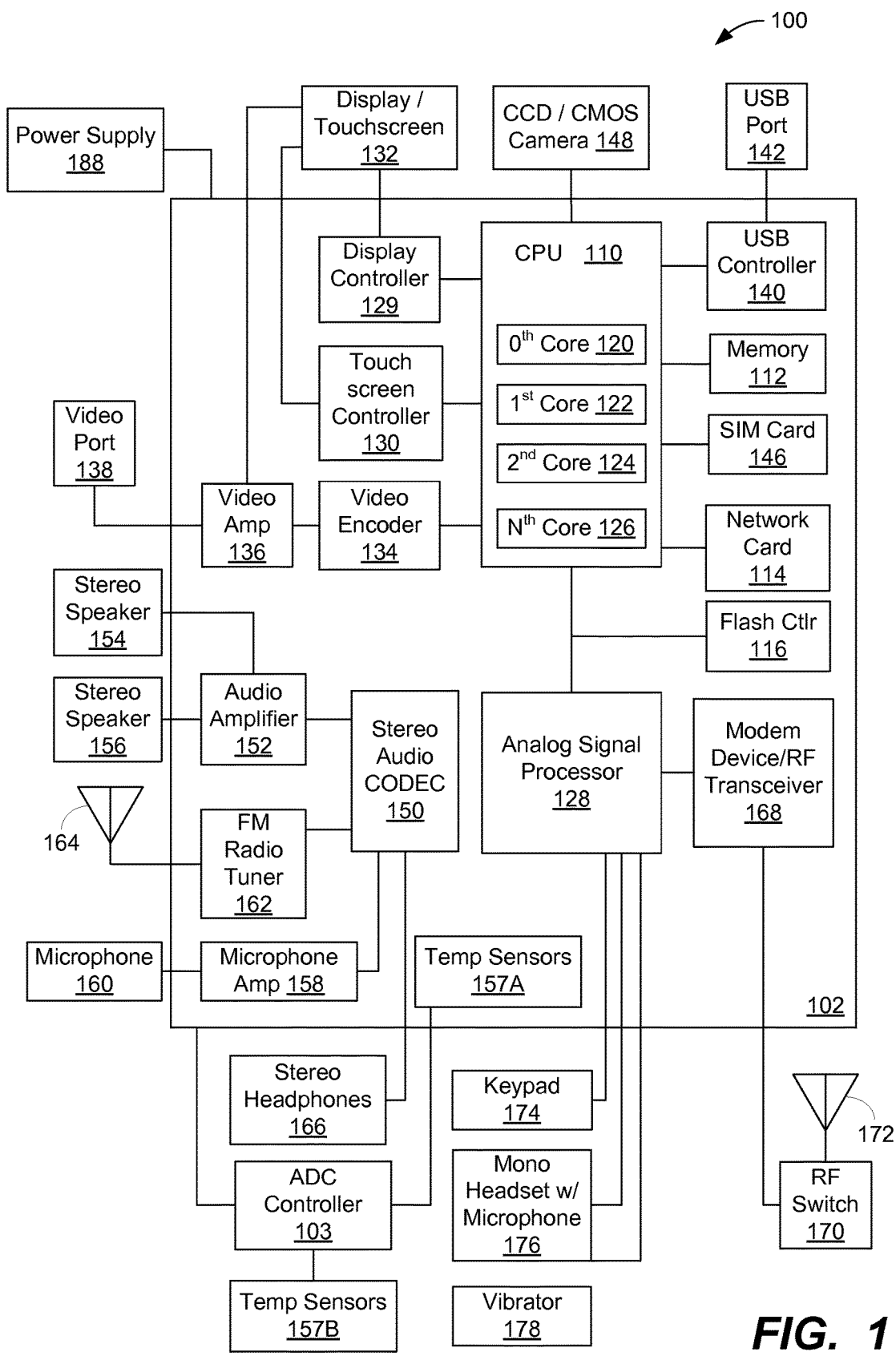
FIG. 1 is a block diagram of an example embodiment of a portable computing device (PCD) in which the improved flash memory performance with a flash memory read cache implementing adaptive prefetching may be implemented.

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content" referred to herein, may also include files that are not executable in nature, such as documents that may need to be opened or other data files or data values that need to be accessed.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer-readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the term "portable computing device" ("PCD") is used to describe any device operating on a limited capacity rechargeable power source, such as a battery and/or capacitor. Although PCDs with rechargeable power sources have been in use for decades, technological advances in rechargeable batteries coupled with the advent of third generation (3G) and fourth generation (4G) wireless technology have enabled numerous PCDs with multiple capabilities. Therefore, a PCD may be a cellular telephone, a satellite telephone, a pager, a PDA, a smartphone, a navigation device, a smartbook or reader, a media player, a combination of the aforementioned devices, a laptop or tablet computer with a wireless connection, among others.

In this description, the terms "central processing unit ("CPU")," "digital signal processor ("DSP"),", "graphics processing unit ("GPU")," "chip," "video codec," "system bus," "image processor," and "media display processor ("MDP")" are non-limiting examples of processing components that may be implemented on an SoC. These terms for processing components are used interchangeably except when otherwise indicated. Moreover, as discussed below, any of the above or their equivalents may be implemented in, or comprised of, one or more distinct processing components generally referred to herein as "core(s)" and/or "sub-core(s)."

In this description, the terms "workload," "process load," "process workload," and "graphical workload" may be used interchangeably and generally directed toward the processing burden, or percentage of processing burden, that is associated with, or may be assigned to, a given processing component in a given embodiment. Additionally, the related terms "frame," "code block" and "block of code" may be used interchangeably to refer to a portion or segment of a given workload. Further to that which is defined above, a "processing component" or the like may be, but is not limited to being, a central processing unit, a graphical processing unit, a core, a main core, a sub-core, a processing area, a hardware engine, etc. or any component residing within, or external to, an integrated circuit within a portable computing device.

One of ordinary skill in the art will recognize that the term "MIPS" represents the number of millions of instructions per second a processor is able to process at a given power frequency. In this description, the term is used as a general unit of measure to indicate relative levels of processor performance in the exemplary embodiments and will not be construed to suggest that any given embodiment falling within the scope of this disclosure must, or must not, include a processor having any specific Dhrystone rating or processing capacity. Additionally, as would be understood by one of ordinary skill in the art, a processor's MIPS setting directly correlates with the power, frequency, or operating frequency, being supplied to the processor.

The present systems and methods provide a cost effective way to improve the performance of flash memories in or connected to a PCD. In an embodiment, a cache controller is in communication with a processor/core/CPU of the PCD and with a cache of the PCD. The cache controller of this embodiment operates independently of the processor/core/CPU and implements adaptive prefetch of information from the flash memory, increasing or decreasing the amount of information prefetched and stored in the cache based on the cache hit rate or percentage.

The systems described herein, or portions of the system, may be implemented in hardware or software as desired. If implemented in hardware devices, the devices can include any, or a combination of, the following technologies, which are all well known in the art: discrete electronic components, an integrated circuit, an application-specific integrated circuit having appropriately configured semiconductor devices and resistive elements, etc. Any of these hardware devices, whether acting or alone, with other devices, or other components such as a memory may also form or comprise components or means for performing various operations or steps of the disclosed methods.

When a system described herein is implemented, or partially implemented, in software, the software portion can be used to perform various steps of the methods described herein. The software and data used in representing various elements can be stored in a memory and executed by a suitable instruction execution system (microprocessor). The software may comprise an ordered listing of executable instructions for implementing logical functions, and can be embodied in any "processor-readable medium" for use by or in connection with an instruction execution system, apparatus, or device, such as a single or multiple-core processor or processor-containing system. Such systems will generally access the instructions from the instruction execution system, apparatus, or device and execute the instructions.

FIG. 1 is a block diagram of an exemplary, non-limiting aspect of a PCD 100 that may implement the systems and methods described herein. The PCD 100 illustrated in FIG. 1 is in the form of a wireless telephone capable of communicating with one or more wireless communication system. Such wireless communication system may be a broadband wireless communication system, including a Long Term Evolution (LTE) system, a Code Division Multiple Access (CDMA) system, a Frequency Division Multiple Access (FDMA) system, a Global System for Mobile Communications (GSM) system, a wireless local area network (WLAN) system, some other wireless system, or a combination of any of these. A CDMA system may implement Wideband CDMA (WCDMA), CDMA 1X, Evolution-Data Optimized (EVDO), Time Division Synchronous CDMA (TD-SCDMA), or some other version of CDMA.

As shown, the PCD 100 includes an on-chip system (or SoC) 102 that includes a multi-core central processing unit (CPU) 110 coupled to an analog signal processor 128. The CPU 110 may comprise a zeroth core 120, a first core 122, second core 124, and an Nth core 126 as understood by one of ordinary skill in the art. Further, instead of a CPU 110, a digital signal processor (DSP) may also be employed as understood by one of ordinary skill in the art. Moreover, as is understood in the art of heterogeneous multi-core processors, each of the cores 120, 122, 124, 126 may have different architectures, may process workloads at different efficiencies, may consume different amounts of power when operating, etc. Each of the cores 120, 122, 124, 126 may control one or more function of the PCD 100. For example, the zeroth core 120 may be a graphics processing unit ("GPU") for controlling graphics in the PCD 100. Such GPU/zeroth core 120 may further include drivers, cache(s), and/or other components necessary to control the graphics in the PCD 100, including controlling communications between the GPU core 120 and memory 112 (including buffers). For another example, a different core such as the Nth core 126 may run the PCD operating system, which may be a high-level operating system (HLOS). Such Nth/HLOS core 126 may further include drivers, cache(s), hardware interfaces, and/or other components necessary to run the HLOS, including communications between the core 126 and memory 112 (which may include one or more of a read only memory (ROM), static random access memory (SRAM), or other types of memory).

Any of the cores 120, 122, 124, 126 may be a separate processor such as a CPU or a digital signal processor. One or more of the cores 120, 122, 124, 126 may include, in addition to a processor, other components such as one or more cache memories. These cache memories may include a dedicated cache memory for a particular core or processor, such as for example an L1 cache. Additionally, or alternatively these cache memories may include a cache memory that is shared with and/or accessible by other cores or processors, such as for example an L2 cache.

Additionally, each of the cores 120, 122, 124, 126 may be functionally grouped together with other components, such as memory 112, sensors, or other hardware of the PCD 100 to form a subsystem as described below. Such subsystem(s) may be implemented in order to perform certain functionality of the PCD, such as an audio subsystem, a GPS subsystem, a sensor subsystem, etc. One or more of such subsystems may also be configured to operate independently of the SoC 102, such as to continue operation when the SoC 102 has been placed into a low or reduced power state or mode, including a power off state or mode.

As mentioned, a memory 112 is illustrated as coupled to the multicore CPU 110 in FIG. 1. This memory 112 may for example be RAM, ROM, flash memory, or any combination thereof. Additionally, the memory 112 may comprise multiple different types of memory located together or located remotely from each other, including buffers, main memories, and caches. Such caches could include one or more L2, L3, LN caches that may be accessed by one or more of the cores 120, 122, 124, 126. Additionally, although the memory 112 is illustrated as located on the SoC 102, the memory 112 may include one or more memories located physically remote from the SoC 102 or "off-chip," such as a Double Data Rate (DDR) memory or a dynamic random access memory (DRAM) in communication with the multicore CPU 110 and/or one or more of the cores 120, 122, 124, 126. One or more of these memories may be controlled by a memory controller located on the SoC 102. Such memory controller(s) may include a flash controller 116 illustrated in FIG. 1 and discussed in more detail below.

As illustrated in FIG. 1, a display controller 129 and a touch screen controller 130 are coupled to the multicore CPU 110. In turn, a display/touchscreen 132, external to the on-chip system 102, is coupled to the display controller 129 and the touch screen controller 130. A digital camera 148 may also be coupled to the multicore CPU 110. In such embodiments, the digital camera 148 may be controlled by one of the cores 120, 122, 124, 126 of the multicore CPU 110. In an exemplary aspect, the digital camera 148 is a charge-coupled device (CCD) camera or a complementary metal-oxide semiconductor (CMOS) camera.

The PCD 100 of FIG. 1 may further include a video encoder 134, e.g., a phase alternating line (PAL) encoder, a sequential couleur a memoire (SECAM) encoder, or a national television system(s) committee (NTSC) encoder, or any other type of video decoder 134 coupled to the multicore CPU 110. Further, a video amplifier 136 is coupled to the video encoder 134 and the display/touchscreen 132. A video port 138 is coupled to the video amplifier 136. As depicted in FIG. 1, a universal serial bus (USB) controller 140 is coupled to the multicore CPU 110. Also, a USB port 142 is coupled to the USB controller 140. A subscriber identity module (SIM) card 146 may also be coupled to the multicore CPU 110. In other embodiments, multiple SIM cards 146 may be implemented.

As further illustrated in FIG. 1, a stereo audio CODEC 150 may be coupled to the multicore CPU 110. Moreover, an audio amplifier 152 may be coupled to the stereo audio CODEC 150. In an exemplary aspect, a first stereo speaker 154 and a second stereo speaker 156 are coupled to the audio amplifier 152. FIG. 1 shows that a microphone amplifier 158 may be also coupled to the stereo audio CODEC 150. Additionally, a microphone 160 may be coupled to the microphone amplifier 158. In a particular aspect, a frequency modulation (FM) radio tuner 162 may be coupled to the stereo audio CODEC 150. Also, a FM antenna 164 is coupled to the FM radio tuner 162. Further, stereo headphones 166 may be coupled to the stereo audio CODEC 150.

FIG. 1 further indicates that a modem device/radio frequency (RF) transceiver 168 may be coupled to the multicore CPU 110. The modem device 168 may support one or more of the wireless communications protocols, such as GSM, CDMA, W-CDMA, TDSCDMA, LTE, and variations of LTE such as, but not limited to, FDB/LTE and PDD/LTE wireless protocols. Additionally, there may be multiple modem devices 168, and in such embodiments, different modem devices 168 may support come or all of the wireless communication protocols and/or technologies listed above.

In some implementations the modem device 168 may be further comprised of various components, including a separate processor, memory, and/or RF transceiver. In other implementations the modem device 168 may simply be an RF transceiver. Further, the modem device 168 may be incorporated in an integrated circuit. That is, the components comprising the modem device 168 may be a full solution in a chip and include its own processor and/or core that may be monitored by the systems and methods described herein. Alternatively, various components comprising the modem device 168 may be coupled to the multicore CPU 110 and controlled by one of the cores 120, 122, 124 of the CUP 110. An RF switch 170 may be coupled to the modem device 168 and an RF antenna 172. In various embodiments, there may be multiple RF antennas 172, and each such RF antenna 172 may be coupled to the modem device 168 through an RF switch 170.

As shown in FIG. 1, a keypad 174 may be coupled to the multicore CPU 110 either directly, or through the analog signal processor 128. Also, a mono headset with a microphone 176 may be coupled to the multicore CPU 110 and or analog signal processor 128. Further, a vibrator device 178 may also be coupled to the multicore CPU 110 and/or analog signal processor 128. FIG. 1 also shows that a power supply 188 may be coupled to the on-chip system 102, and in some implementations the power supply 188 is coupled via the USB controller 140. In a particular aspect, the power supply 188 is a direct current (DC) power supply that provides power to the various components of the PCD 100 that require power. Further, in a particular aspect, the power supply 188 may be a rechargeable DC battery or a DC power supply that is derived from an alternating current (AC) to DC transformer that is connected to an AC power source.

The multicore CPU 110 may also be coupled to one or more internal, on-chip thermal sensors 157A as well as one or more external, off-chip thermal sensors 157B. The on-chip thermal sensors 157A may comprise one or more proportional to absolute temperature (PTAT) temperature sensors that are based on vertical PNP structure and are usually dedicated to complementary metal oxide semiconductor (CMOS) very large-scale integration (VLSI) circuits. The off-chip thermal sensors 157B may comprise one or more thermistors. The thermal sensors 157 may produce a voltage drop that is converted to digital signals with an analog-to-digital converter (ADC) controller 103. However, other types of thermal sensors 157 may be employed without departing from the scope of the disclosure.

FIG. 1 further indicates that the PCD 110 may also include a network card 114 that may be used to access a data network, e.g., a local area network, a personal area network, or any other network. The network card 114 may be a Bluetooth network card, a WiFi network card, a personal area network (PAN) card, or any other network card well known in the art. Further, the network card 114 may be incorporated in an integrated circuit. That is, the network card 114 may be a full solution in a chip, and may not be a separate network card 114.

As depicted in FIG. 1, the display/touchscreen 132, the video port 138, the USB port 142, the camera 148, the first stereo speaker 154, the second stereo speaker 156, the microphone 160, the FM antenna 164, the stereo headphones 166, the RF switch 170, the RF antenna 172, the keypad 174, the mono headset 176, the vibrator 178, and the power supply 180 are external to the SoC 102.

The SoC 102 may also include various buses and/or interconnects (not shown) to communicatively couple the multicore CPU 110 and/or one or more of the cores 120, 122, 124, 126 with other subsystems or components of the SoC 102 or PCD 100. It should be understood that any number of bus and/or interconnect controllers may also be implemented and arranged to monitor a bus/interconnect interface in the on-chip system 102. Alternatively, a single bus/interconnect controller could be configured with inputs arranged to monitor two or more bus/interconnect interfaces that communicate signals between CPU 110 and various subsystems or components of the PCD 100 as may be desired.

One or more of the method steps described herein may be enabled via a combination of data and processor instructions stored in the memory 112, a memory located external to SoC 102, and/or one or more controller, such as flash controller 116 illustrated in FIG. 1. These instructions may be executed by one or more cores 120, 122, 124, 126 in the multicore CPU 110 and/or other components and subsystems of the SoC 102 in order to perform the methods described herein. Further, the multicore CPU 110, one or more of the cores 120, 122, 124, 126, the memory 112, other components of the PCD 100 such as the flash controller 116, or a combination thereof may serve as a means for executing one or more of the method steps described herein.

Figure 2:
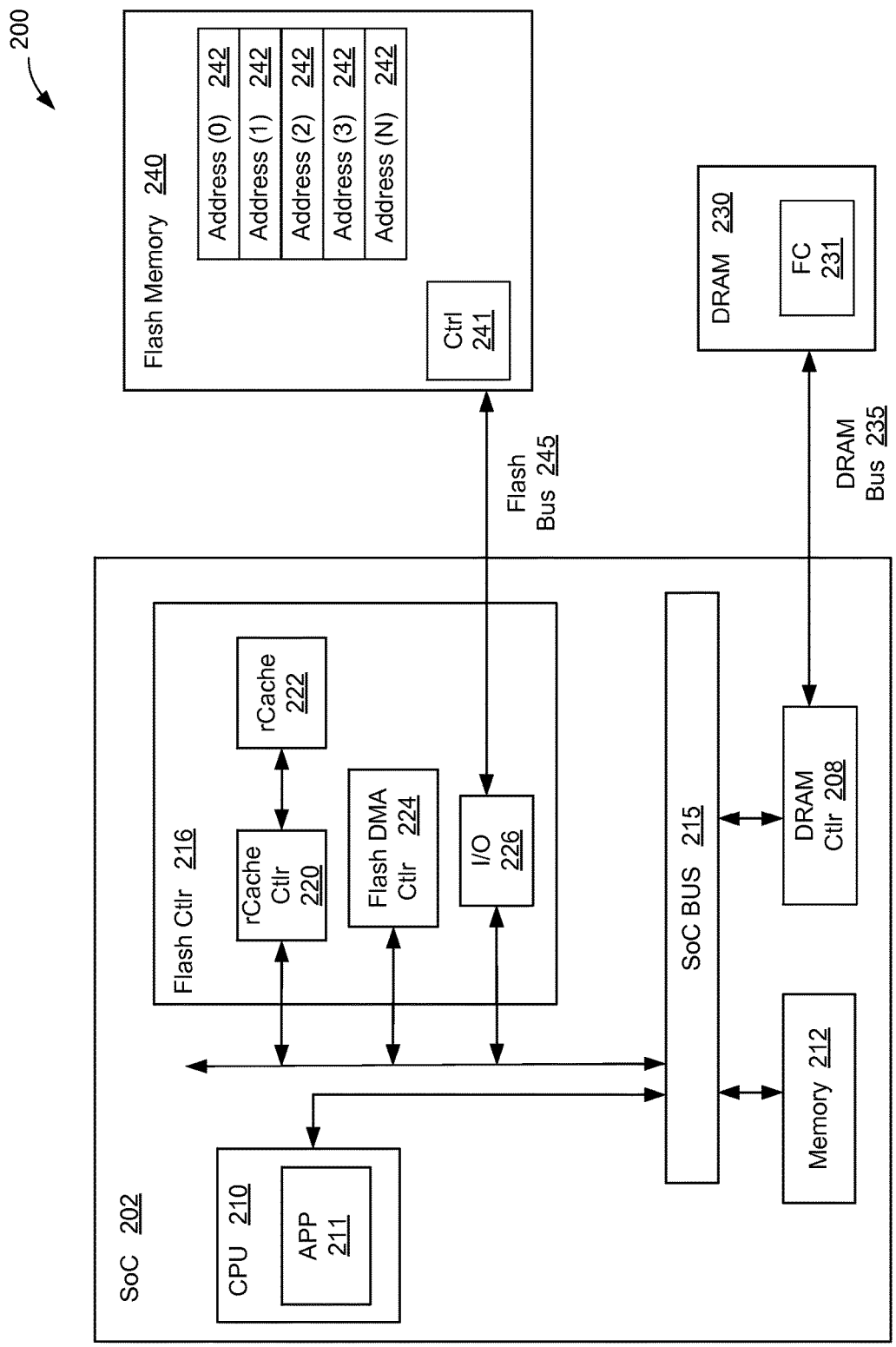
FIG. 2 is a block diagram showing an exemplary embodiment of a system for improved flash memory performance using a flash memory read cache and adaptive prefetching that may be implemented in a PCD, such as the PCD embodiment illustrated in FIG. 1.

FIG. 2 is a block diagram showing an exemplary embodiment of a system for improved flash memory performance using a flash memory read cache and adaptive prefetching that may be implemented in a PCD, such as the PCD embodiment illustrated in FIG. 1. The exemplary system 200 includes a system-on-a-chip (SoC) integrated circuit 202, which could be implemented in a PCD (similar to the SoC 102 in FIG. 1). The SoC 202 of FIG. 2 includes a CPU 210 (which may be similar to the CPU 110 in FIG. 1) connected to an SoC interconnect or bus 215 of the SoC 202. The SoC bus 215 may be any desired type of bus or interconnect, with any quantity of shared or independent ports, and may depend on the architecture of the SoC 202 and/or the uses for which the SoC 202 or PCD are intended.

In the embodiment illustrated in FIG. 2, an "off-chip" DRAM 230 is also connected to the SoC bus 215 via a DRAM bus 235 coupling the DRAM 230 to a DRAM controller 208 located on the SoC 202. An "off-chip" flash memory 240 is also connected to the SoC bus 215 via a flash bus 245 coupling the flash memory 240 to an input/output (I/O) 226 of a flash controller 216 located on the SoC 202. One or more of DRAM 230 and flash memory 240 may be located on the SoC 202 rather than "off-chip" in other embodiments. In such alternative embodiments one or more of the flash bus 245 and DRAM bus 235 may not be a separate bus, but may instead be a part of the SoC bus 215. In such alternative embodiments, an SoC bus 215 may be omitted, with the CPU 210, Flash Controller 216, Memory 212, and DRAM Controller 208 sharing a single bus.

The SoC 202 may also include other components and/or sub-systems (including those illustrated in FIG. 1) which are not shown in FIG. 2 for clarity. CPU 210 will include at least one processor and may in some embodiments include multiple processors such as cores 1120, 122, 124, 126 discussed above for FIG. 1. Additionally, the SoC 202 may include one or more memory 212 (similar to memory 112 of FIG. 1) which may be one or more of an SRAM, ROM, or other type of memory. Additionally, in some embodiments, the components illustrated in FIG. 2 may be physically arranged on the SoC 202 in varying configurations, and one or more components illustrated in FIG. 2 may not be physically located near each other on the SoC 202.

The DRAM 230 may be a main or operating memory for the PCD, such that an application 211 executed by the CPU 210 accesses the DRAM 230 through the DRAM controller 208. In operation, the CPU 210 may read and/or write information from/to the DRAM 230. The DRAM 230 may include a portion serving as a file cache 231 for data frequently written to and/or read from the flash memory 240, which may be in the form of "pages" as will be understood. File cache 231 will typically be a "soft" cache that is controlled by the CPU 210 operating through the DRAM controller 208.

The flash memory 240 may be located remote from the SoC 202 as illustrated in FIG. 1, or may be located in or on the SoC 202. Flash memory 240 may include any type of non-volatile storage and be implemented as an embedded multimedia card (eMMC), solid state drive (SSD), universal flash storage (UFS), or NVM Express (NVMe)-type memory. These devices may employ any type of non-volatile cell elements including NAND flash, NOR flash, EEPROM, magnetic, optical, resistive, charge, and/or phase-change cell technology. Additionally, in some embodiments, the flash memory 240 may be removably connected to the SoC 202. In operation, the CPU 210 may read and/or write information from/to the flash memory 240 through the flash controller 216 in communication with the CPU 210 and the flash memory 240.

For example, the CPU 210 may cause information to be read from one or more address 242 of the flash memory 240 and stored in the DRAM 230 for execution by the CPU 201, such as when the CPU 210 is executing an application 211. Additionally, the CPU 210 may cause information in the DRAM 230 to be stored in one or more address 242 of the flash memory 240, such as for example portions of/data for an application 211 that is not currently being executed by the CPU 210.

The flash controller 216 of the SoC 202 is in communication with the flash memory 240 and includes an I/O 226 and a flash direct memory access controller (DMA) 224 whose operation is understood by one of skill in the art. In the embodiment illustrated in FIG. 2, the flash controller 216 also includes a read cache controller (rCache controller 220) coupled to a read cache (rCache 222) whose operation(s) is discussed below. rCache controller 220 is implemented as a hardware component or device located on the SoC 202 separate from the CPU 210 in the embodiment of FIG. 1. In other embodiments, the rCache controller 220 may instead be implemented in firmware or software, and may be located separately from the flash controller 216.

The rCache controller 220 is in communication with the rCache 222 and is implemented as a separate RAM memory of the flash controller 216 in the embodiment illustrated in FIG. 1. In other embodiments, the rCache 222 may be a different type of memory, may be a portion of another memory on the SoC 202 (such as memory 212 illustrated in FIG. 1), or may be located remotely from the SoC 202 (such as being implemented as a portion of DRAM 230). In operation, the rCache controller 220 operates separately from the CPU 210 and stores or buffers prefetched pages or information from the flash memory 240 in the rCache 222. The rCache controller 220 also adaptively adjusts the amount of information/number of pages prefetched and stored in the rCache 222 based at least in part on a hit rate or hit percentage for the prefetched information/pages stored in the rCache 222.

Figure 3:
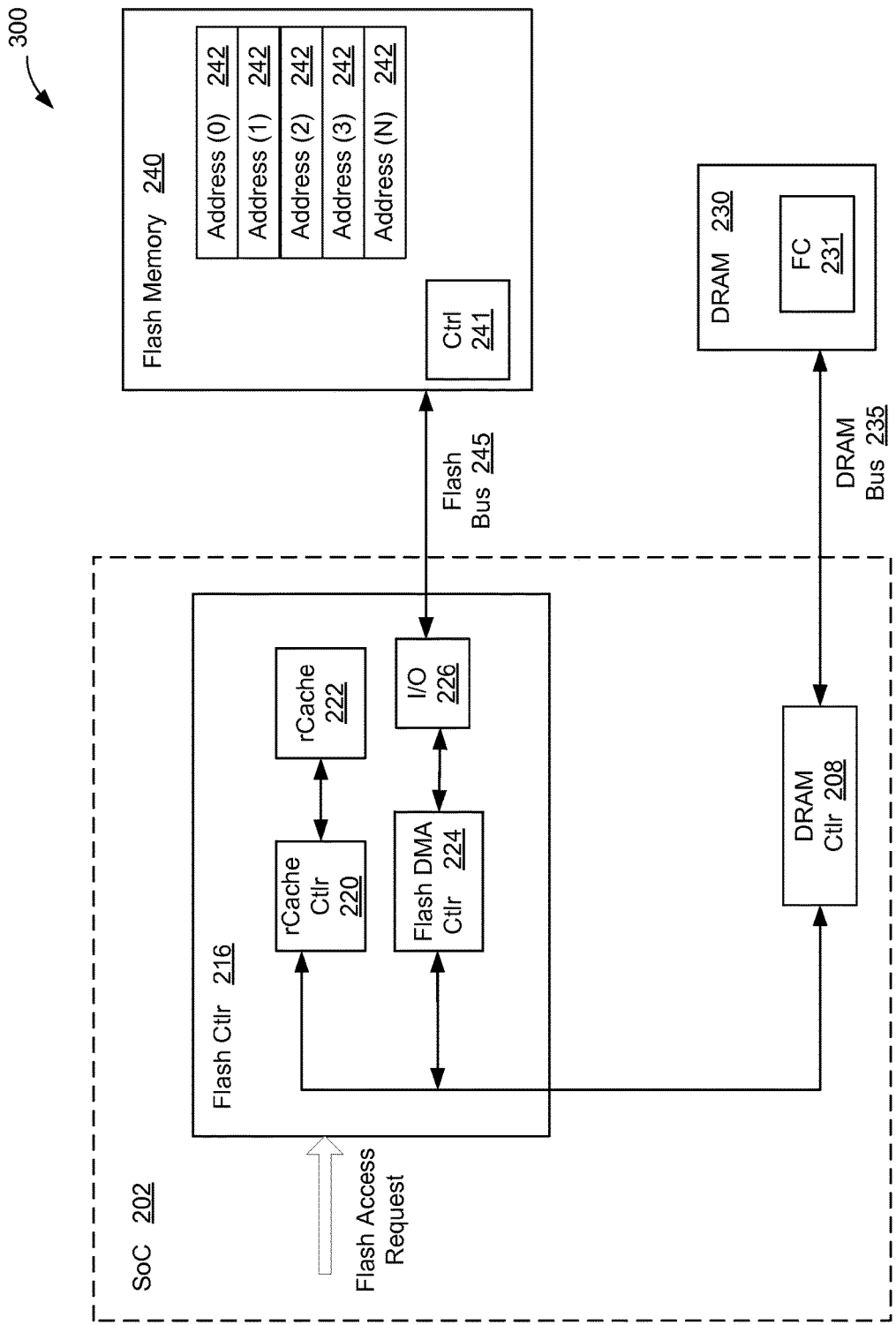
FIG. 3 is a block diagram showing the inter-operation of exemplary portions of the system of FIG. 2.

For example, FIG. 3 is a block diagram showing the inter-operation of exemplary portions of the system of FIG. 2. As illustrated in FIG. 3, during operation, the flash controller 216 receives a request for access to the flash memory 240. Such access request may come from CPU 210 of FIG. 2, or from another component of the SoC 202. Such request may, for example be an instruction from the CPU 210 to read or write information from/to one or more address 242 in flash memory 240.

In an example where the access request is an initial instruction from the CPU 210 to read information from an address (0) 242 of the flash memory 240 for storage in the DRAM 230, the CPU 210 will cause the flash DMA controller 224 to retrieve the information from address (0) 242 to be retrieved. The CPU 210 will then cause the DRAM controller 208 to store the information into an address in DRAM 230 and to cache some portion of the information in file cache 231 of DRAM 230. The rCache controller 220 will cause the flash DMA controller 224 to also prefetch a predetermined quantity of additional pages from additional addresses 242 of flash memory 240 and will store the additional information in rCache 222.

Continuing with the example, for subsequent requests by the CPU 210 to read information from the flash memory 240, the rCache controller 220 will first check if the information requested by the CPU 210 is already stored in the rCache 222. If so, the rCache controller 220 will provide that information to the CPU 210 from the rCache 222 and delete the date from the rCache 222. If the information requested by CPU 210 is not in the rCache 220, the information will be retrieved from the flash memory 240 and stored in the DRAM 230 as before. The rCache controller 220 will determine whether to decrease or increase the size of the prefetch/amount of information prefetched from the flash memory 240. This determination will be made at least in part on the number or percentage of previous "hits" or successful retrievals from the rCache 222. The rCache controller 220 will then cause the new amount of information to be prefetched/retrieved and placed into the rCache 222. For subsequent requests by the CPU 210 to read information from the flash memory 240, the rCache controller 220 will continue to adaptively adjust the prefetch size for the rCache 222.

Another example is where the access request is an instruction from the CPU 210 to write information to an address(0) 242 of the flash memory 240, such as information in the DRAM 230 that the CPU 210 no longer requires for an application 211 being executed. In this example, the CPU 210 will cause the DRAM controller 208 to retrieved the information from the DRAM 230 and the CPU 210 will cause the flash DMA controller 224 to store information into an address (0) 242 of the flash memory 240. The rCache controller 220 will not cause a prefetch to occur in this example. The rCache controller 220 will determine whether the rCache 222 has any data from the same address 242, address (0) in this example, being written by the CPU 210. If the rCache 222 does have data associated with address (0) 242, the rCache controller 220 causes that entry in the rCache 222—now "dirty" data—to be deleted.

It is known that by increasing the size of the prefetch, the read performance of the a flash memory can be improved. However, it has been determined that there are points of diminishing returns for increasing the size of the prefetch. In other words, beyond certain sizes of prefetch, only minimal improvements of read performance may be obtained do to the wasted cache resources and energy. For example, as illustrated in graph 1 of FIG. 4C, there can be a prefetch size range, below which the read performance drops and above which the read performance improvements are offset by the increased resource and energy costs.

Figure 4A:
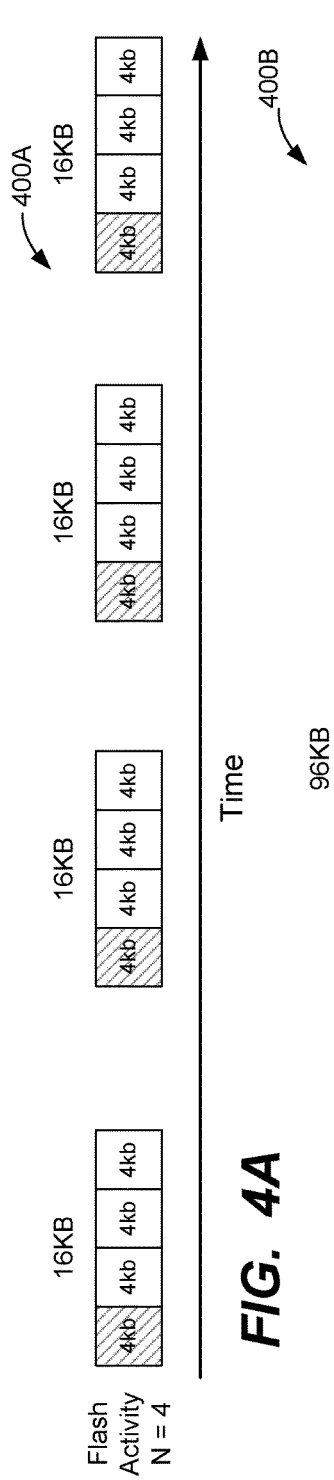
FIGS. 4A-4C are diagrams illustrating exemplary results of the inter-operation illustrated in FIG. 3.
Figure 4B:
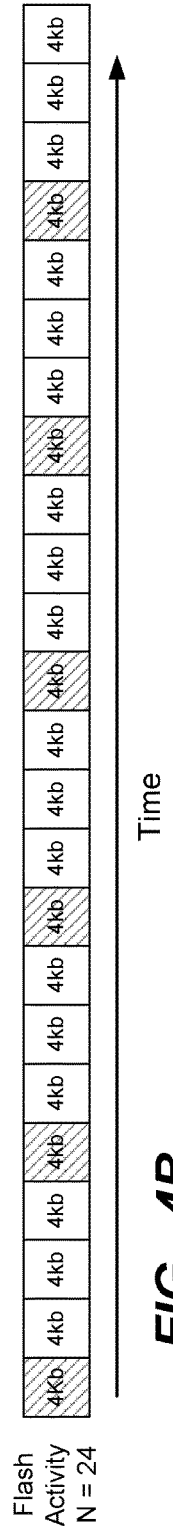
Figure 4C:
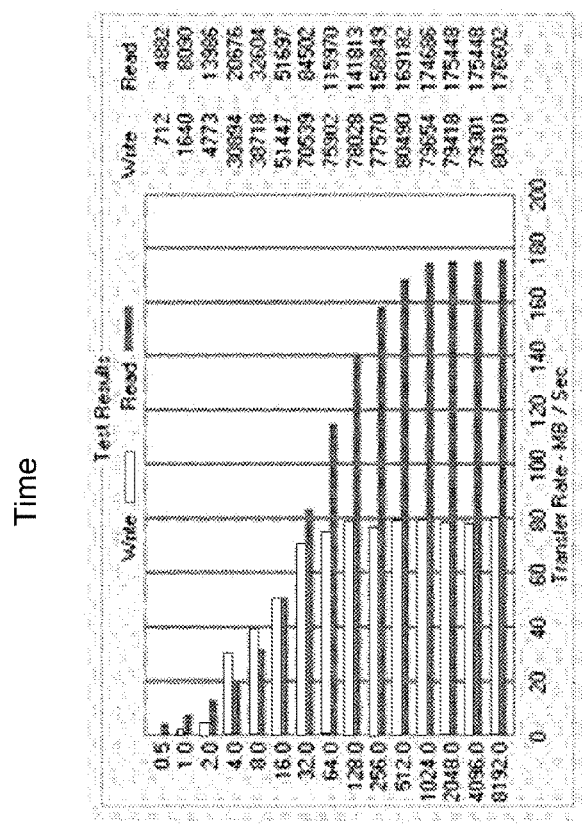

Additionally, it has been determined that maintaining large prefetch sizes for all situations, such as random reads of a flash memory by a CPU, can also reduce or offset any improvements in read performance. By adaptively adjusting the size of the prefetch as disclosed herein it is possible to further improve the read performance of the flash memory, while minimizing resource and energy costs. For example, FIGS. 4A-4B are diagrams illustrating exemplary results of the inter-operation illustrated in FIG. 3. As illustrated in FIG. 4A, when a CPU (such as CPU 210 of FIG. 2) is performing infrequent or random reads of a flash memory (such as flash memory 240 of FIGS. 2-3), it is beneficial to start with, and maintain, a smaller prefetch size.

In the example of FIG. 4A, the prefetch size, N, is set to 4 which results in 4×4 KB pages being prefetched from the flash memory 240 and stored in the rCache 222 (see FIG. 3) for each CPU 210 read of the flash memory 240. This relatively smaller prefetch size N=4 may be initially determined from information, such as a file type of an application 211 that the CPU 210 is executing, such as a database file type which may be expected to result in random reads of information from the flash memory 240. The relatively smaller prefetch size N=4 may also be initially determined, or arrived at, as a result of the rCache controller 220 determining that a relatively small number or percentage of "hits" on the contents of the rCache 222 (see FIG. 3) justifies reducing the prefetch size to N=4. As a result, as illustrated in FIG. 4A, a smaller amount of prefetch information is stored in the rCache 222 with each CPU 210 read of the flash memory 240, requiring less time to load the prefetch information into the rCache 222 and consuming less of the rCache 222.

Turning to the example of FIG. 4B, the prefetch size, N, is set to a larger value 24 which results in 24×4 KB pages being prefetched from the flash memory 240 and stored in the rCache 222 (see FIG. 3) for each CPU 210 read of the flash memory 240. This relatively larger prefetch size N=24 may be initially determined from information, such as a file type of an application 211 that the CPU 210 is executing, such as a movie or multi-media file type which may be expected to result in multiple sequential reads of information from the flash memory 240. The relatively larger prefetch size N=24 may also be initially determined, or arrived at, as a result of the rCache controller 220 determining that a relatively large number or percentage of "hits" on the contents of the rCache 222 (see FIG. 3) justifies increasing the prefetch size to N=24.

As a result, as illustrated in FIG. 4B, a larger amount of prefetch information is stored in the rCache 222 with each CPU 210 read of the flash memory 240. The larger amount of prefetch information/larger number of prefetch pages takes longer to load into the rCache 222 than the smaller amount of prefetch information of FIG. 4A. However, more information can be loaded into the rCache 222 over the same time period with the larger prefetch size of FIG. 4B than is possible with the smaller prefetch size of FIG. 4A. It has been determined that this increased time to load the larger prefetch into rCache 222 is justified by the increased flash memory read performance from the larger number/percentage of hits on the rCache 222, as is shown in Graph 1 of FIG. 4C.

Figure 5A:
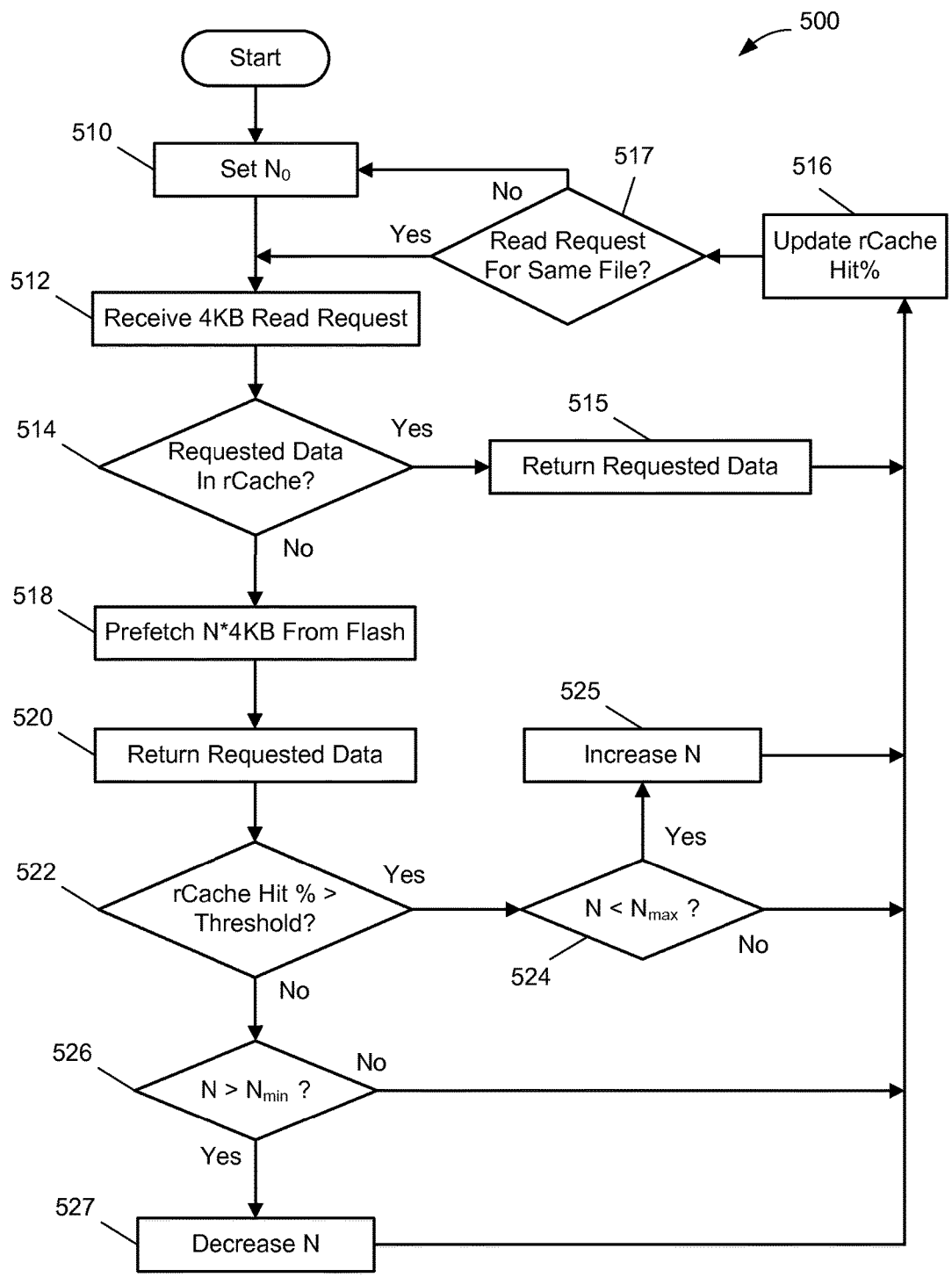
FIG. 5A is a flowchart illustrating an exemplary embodiment of a method for improved flash memory performance with a flash memory read cache implementing adaptive prefetching may be implemented.

If conditions change, such as the number or percentage of rCache 222 hits decreasing and/or the CPU 210 executing a different application 211, it may no longer be beneficial to have the relatively large prefetch size of FIG. 4B. Therefore, it is desired to adaptively adjust the size of the prefetch, including decreasing the prefetch size, based on the operating conditions. Such adaptive prefetching can increase the flash memory read performance over previous prefetch methods, and can show significant performance improvements in lower cost flash memories, such as eMMC flash memories. FIG. 5A is a flowchart illustrating an exemplary embodiment of a method for improved flash memory performance using a read cache and adaptive prefetching. In an embodiment, the method 500 of FIG. 5A is implemented by the rCache controller 220 of FIGS. 2-3, either operating alone or operating in conjunction with other components or portions of the systems 200, 300 illustrated in FIGS. 2-3.

The exemplary method 500 begins in block 510 with the setting of an initial value $N_0$ for the prefetch size. In an embodiment, setting $N_0$ in block 510 may include determining, such as by rCache controller 220, an initial value $N_0$ based on information provided by, or determined from, the file system, upstream client that may be accessing the flash memory 240, etc. For example, in an embodiment, $N_0$ may represent a number of 4 KB "pages" stored in one or more addresses 242 of a flash memory 240. The initial value of $N_0$ may be set at a higher value, such as 64 for instance, where the rCache controller 220 determines that sequential access to multiple addresses 242 of the flash memory 240 is more likely. This determination may be based on the type of access or the type file being accessed in the flash memory 240 for example, such as the file being an MP4, MOV, AVI, or other multi-media file type where sequential access to flash memory 240 is expected. A program or application 211 may also suggest or hint that the program will be reading flash memory in a sequential fashion. The determination and/or the hint is passed through a software input/output driver responsible for configuring and controlling the flash controller 216. Similarly, other components of the SoC 202 which access flash memory 240 may communicate a hint to a common software input/output driver. Alternatively, other components of the SoC 202 may directly configure and control the flash controller 216.

Conversely, the initial value of $N_0$ may be set to a lower value where the rCache controller 220 determines that fewer or random access to the flash memory 240 is more likely. This determination may again be based on the type of access (such as a system call to the flash memory 240) or a file type such as a database file type where fewer and/or random access to the flash memory 240 is expected. In an embodiment, there may be a sliding scale for the initial value of $N_0$ with the lowest value of $N_0$ set for expected single accesses (such as a system call), a middle value of $N_0$ set for few and/or random expected accesses, and a larger value of $N_0$ set for more and/or sequential expected accesses.

A read request for the flash memory (such as flash memory 240 of FIGS. 2-3) is received in block 512. In an embodiment, the read request may be from a CPU 210 executing an application 211. The read request of block 512 may be received at multiple components of the systems 200, 300 of FIGS. 2-3, including the rCache controller 220, which may be part of a flash controller 216 as illustrated in FIGS. 2-3. The read request may be for one or more 4 KB "pages" that are associated with one or more addresses 242 of the flash memory 240 as described in block 512. In other embodiments, the read request of block 512 may be for other, or different, sizes of data.

In block 514 a determination is made whether the data requested in the read request of block 512 is already stored in the rCache 222. This determination may be made by the rCache controller 220 and/or other component of the system 200, 300 using various known methods or means. If the requested data is determined to be in the rCache 222 in block 514, the method 500 continues to block 515 and the requested data is returned from the rCache 222. In an embodiment, returning the requested data of block 515 may comprise the rCache controller 220 causing the requestor to read the data from the rCache 222. In other embodiments, returning the requested data of block 515 may comprise the rCache controller 220 causing some other component to return the information stored in the rCache 222 to the component from which the read request was received in block 512. Returning the requested data of block 515 may also comprise in some embodiments causing the requested data to be deleted from the rCache 222 since the data is now "used" such that there is no need to continue caching the data in the prefetch rCache 222.

Continuing with this flow path of the method 500, after returning the requested data in block 515, the hit percentage or hit rate of the rCache 222 is updated in block 516 and the method 500 waits at block 517 for the next read request for the flash memory 240. Updating the hit percentage of rCache 222 in block 516 may be performed by rCache controller 220, and may include updating a running total or percentage of successful accesses of prefetch information stored in the rCache 222. Turning to block 517, if the next read request is a continuation of the existing file, then the next 4 KB of data is read in block 512. If the next read request belongs to a different file (with different file extension or program hint), then the software input/output driver will configure a new value of $N_0$ in block 510.

In some embodiments updating the hit percentage in block 516 may also include updating one or more counters or values with associated how long various data has been stored in the rCache 222. For example, a counter associated with each address of the rCache 222 may be updated to reflect an increasing length of time that the data has been stored in the rCache 222 without being accessed or used. For another example, a counter associated with an address of the rCache 222 may be updated to reflect that no data is currently stored in the address such as when "used" data is deleted from an address of the rCache 222. In some embodiments, the hit percentage in block 516 may be the long term average across all files and all components of the SoC 202. In other embodiments, the hit percentage in block 516 may be the short term average corresponding only to the current file or the current component of the SoC 202.

Returning to block 514, if the determination is that the requested data is not in the rCache 222, the method 500 proceeds to block 518 where data is prefetched from the flash memory 240 and stored in the rCache 222. The amount/size of the prefetch in block 518 depends on the current value of N, which for the embodiment illustrated in FIG. 5A is a number of 4 KB "pages" stored in one or more of address(0)-address(N) 242 of flash memory 240. For the first read request, N is set at $N_0$ as discussed above for block 510. For subsequent read requests, the value of N may be incremented up or down as discussed below, such that the current value of N used in block 518 to determine the size of the prefetch is different from $N_0$. In an embodiment, block 518 may be performed by the rCache controller 220 either acting alone, or in conjunction with other components such as flash DMA controller 224 (see FIG. 2) to cause the proper amount of prefetch data/number of prefetch pages to be read from flash memory 240 and stored in rCache 222.

In block 520, the data requested in block 512 is returned to the component requesting the data. Note that it is not necessary that block 520 occur after block 518 as illustrated in the exemplary embodiment of FIG. 5A. In other embodiments, block 520 may occur before, or at the same time/in parallel with the retrieval of the prefetch data of block 518. For example, in an embodiment, blocks 518 and 520 may be combined such that one retrieval of both the data requested in block 512 and the prefetch information determined in block 518 is performed. In such embodiments, the data requested in block 512 may be returned to the component requesting the data (such as by flash DMA controller 224) while at the same time, the prefetch data may be stored in the rCache 222 (such as by rCache controller 220). In other embodiments the steps of block 518 and 520 may be performed in a different order and/or by the same or by different components of the system 200.

The method 500 continues in block 522 where it is determined whether the a hit percentage and/or number of hits for the rCache 222 is above a threshold value. As discussed above for FIGS. 2-3, the rCache controller 220 receives any read requests for the flash memory 240 (such as from the CPU 210) and tracks the "hits" and/or hit "rate" where the information requested by has already been prefetched and stored in the rCache 222. In block 522 of method 500, the rCache controller 220 evaluates whether the current hit "rate" or hit percentage is above a threshold in order to adaptively adjust the amount of data prefetched and stored in the rCache 222.

The threshold value may be a fixed value stored in either the rCache controller 220 or rCache 222, set by either the manufacture or by a user, and may be determined and set based on a variety of factors such as SoC 202 and/or CPU 210 architecture, the uses to which the PCD will be put, end user performance preferences, a performance profile, etc. In some embodiments, the threshold value may be altered or changed, such as by an end user as desired, such as based on the types of files or applications the end user expects to access or execute, end user performance preferences, etc. In the embodiment illustrated in FIG. 5A, if the rCache 222 hit percentage is determined to be above the threshold value the method 500 continues to block 524, while if the rCache 222 hit percentage is determined to be below the threshold value the method continues to block 526.

In other embodiments, the determination in block 522 may not be a binary determination, but instead may include a variety of options. For example, in an alternative embodiment (not illustrated) the threshold of block 522 may comprise an upper threshold and a lower threshold. In this alternative embodiment, if the determination is that the rCache 222 hit percentage is above the upper threshold, the method continues to block 524. Similarly, in this alternative embodiment, if the determination is that the rCache 222 hit percentage is below the lower threshold, the method continues to block 526. However, if the determination is that the hit percentage of the rCache 222 is between the upper and lower thresholds, no adjustment to the prefetch size is needed and the alternative method may continue to block 516. As will be understood, other variations of the determination in block 522 are also possible.

Returning to block 522 of the illustrated method 500, if the rCache 222 hit percentage is determined to be above the threshold value the method continues to block 524 where a determination is made whether the current value N for the size of the prefetch is below a maximum value $N_{max}$. If the current value of N is not less than $N_{max}$—i.e. if the current N already equals the $N_{max}$—the method 500 proceeds to block 516 discussed above where the rCache 222 hit percentage is updated and/or counter(s) associated with data in the rCache 222 is/are updated.

If the current value of N is determined in block 524 to be less than $N_{max}$, the method 500 proceeds to block 525 where N is increased. Increasing the value of N in block 525 increases the prefetch size/amount of information prefetched and stored in rCache 222 for subsequent reads of the flash memory 240. The amount of increase in block 525 may be variable. In one embodiment, the increase may be a larger number for sequential type of accesses and smaller for short and random accesses. In another embodiment, the amount of increase may be a constant value. In yet another embodiment, the amount of increase may be geometric, e.g. double, triple, etc.

The method 500 proceeds to block 516 discussed above where the rCache 222 hit percentage is updated and/or counter(s) associated with data in the rCache 222 is/are updated. The value of $N_{max}$ may be a fixed value in some embodiments, and may be a value of N above which the incremental improvement in the read performance of the flash memory is outweighed by the increased time/resource costs of the increased prefetch size as illustrated in Graph 1 of FIG. 4C. In such embodiments, the value of $N_{max}$ may be set by the manufacturer or end user in differing implementations. In other embodiments, the value of $N_{max}$ may be variable, and may be set and/or updated based on historical information, usage statistics, the type of file being accessed in the flash memory 420, etc.

Returning again to block 522 of the illustrated method 500, if the rCache 222 hit percentage is determined to be below the threshold value the method continues to block 526 where a determination is made whether the current value N for the size of the prefetch is above a maximum value $N_{min}$. If the current value of N is not greater than $N_{min}$—i.e. if the current N already equals the $N_{min}$—the method 500 proceeds to block 516 discussed above where the rCache 222 hit percentage is updated and/or counter(s) associated with data in the rCache 222 is/are updated.

If the current value of N is determined in block 526 to be greater than $N_{min}$, the method 500 proceeds to block 527 where N is decreased. Decreasing the value of N in block 527 decreases the prefetch size/amount of information prefetched and stored in rCache 222 for subsequent reads of the flash memory 240. As described above for increasing N in block 525, the amount of decrease in block 527 may also be variable. The method 500 proceeds to block 516 discussed above where the rCache 222 hit percentage is updated and/or counter(s) associated with data in the rCache 222 is/are updated. The value of $N_{min}$ may be a fixed value in some embodiments, and may be a value of N below which the read performance of the flash memory begins to decrease as illustrated in Graph 1 of FIG. 4C. In such embodiments, the value of $N_{min}$ may be set by the manufacturer or end user in differing implementations. In other embodiments, the value of $N_{min}$ may be variable, and may be set and/or updated based on historical information, usage statistics, the type of file being accessed in the flash memory 420, etc.

Although an exemplary method 500 has been described in the context of FIG. 5A, it will be understood that other methods or embodiments of the method 500 may be implemented. For example, in an alternative embodiment (not shown), blocks 524 and 526 may not be separate determinations as illustrated in FIG. 5A, but instead may be a single block that determines whether the current value of N exceeds $N_{max}$ or is below $N_{min}$ and adjusts the value of N accordingly. The determinations of block 524 and 526 could also be part of the determination of block 522 in some embodiments. Other embodiments and/or alterations of the method 500 of FIG. 5A are also possible as would be understood.

Figure 6A:
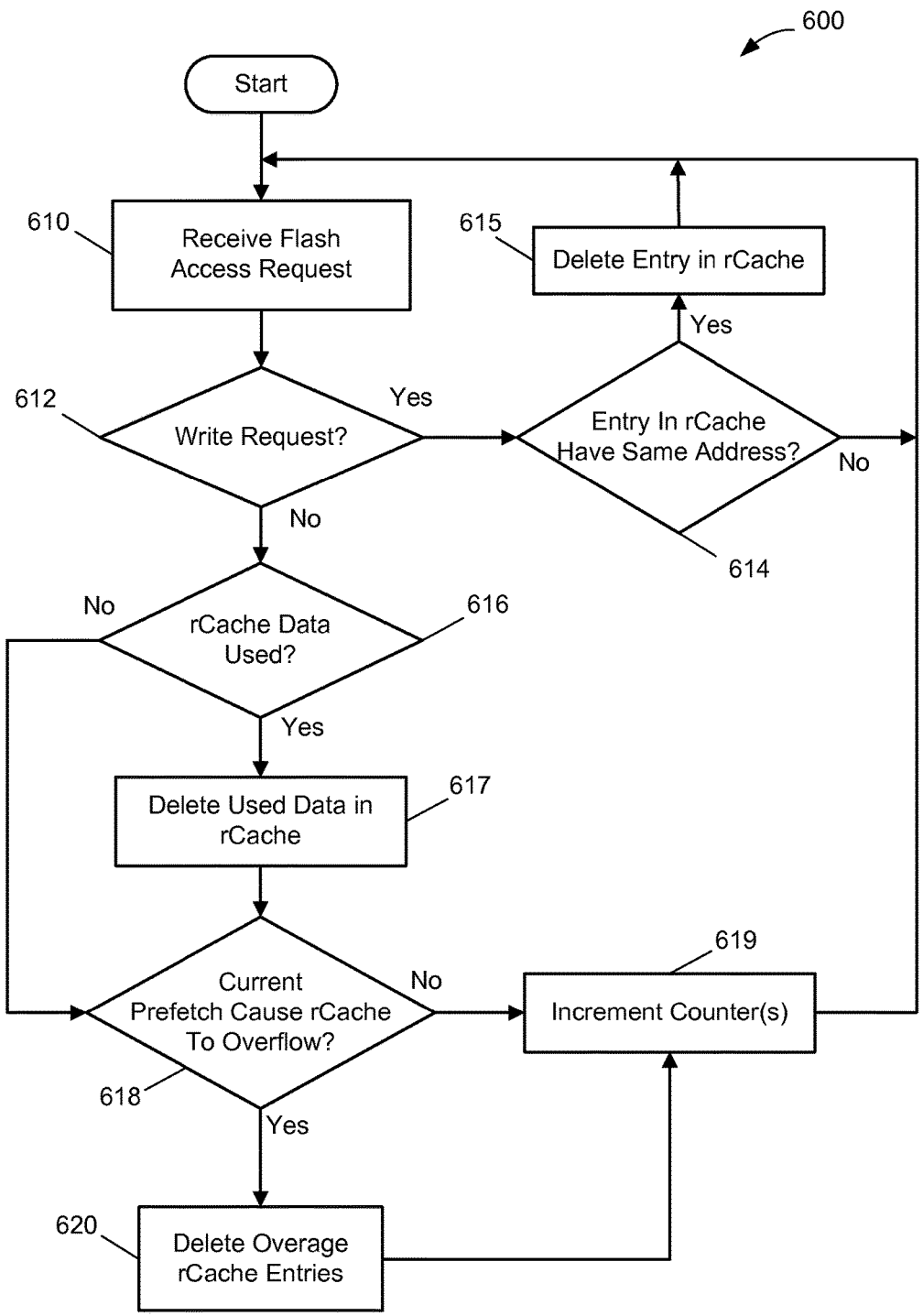
FIG. 6A is a flowchart illustrating additional aspects of an exemplary embodiment of a method for improved flash memory performance with a flash memory read cache implementing adaptive prefetching may be implemented.

Turning next to FIG. 6A, additional aspects of an exemplary embodiment of a method 600 for improved flash memory performance using a flash memory read cache and adaptive prefetching are illustrated. In particular, FIG. 6A illustrates additional aspects of the management of the rCache 222, such as by rCache controller 220 (see FIG. 2). The method 600 may operate as part of, or in conjunction with, one or more of the steps of method 500 illustrated in FIG. 5A, and one or more of the blocks of method 600 may be performed by the rCache controller 220 acting by itself or in conjunction with other components of the system 200 (see FIG. 2). The exemplary method 600 of FIG. 6A begins in block 610 with the receipt of a request for access to the flash memory (such as flash memory 240 of FIGS. 2-3). As discussed below, the request for access in block 610 may be, but is not necessarily, a read request like that discussed in relation to block 512 of the method 500 illustrated in FIG. 5A. In an embodiment, the request for access may be from a CPU 210 executing an application 211 as illustrated in FIG. 2. The request for access to the flash memory of block 610 may be received at multiple components of the systems 200, 300 of FIGS. 2-3, including the rCache controller 220, which may be part of a flash controller 216 as illustrated in FIGS. 2-3. The request for access may be to read from or write to one or more 4 KB "pages" associated with one or more addresses(0)-(N) 242 of the flash memory 240. In other embodiments, the request for access may be for other, or different, sizes of data in the flash memory 240.

In block 612, a determination is made whether the request received in block 610 is a write request, for example the CPU 210 writing information to one or more addresses 242 in the flash memory 240. If the request is a write request, the method 600 continues to block 614 where a determination is made whether any entry in the rCache 222 is associated with the address 242 in the flash memory 240 to which data will be written. One example for performing the search in block 614 is through the use of a content addressable memory (CAM) which can provide immediate hardware lookup of the provided address. As discussed above, once data is prefetched from an address(0) 242 and written into the prefetch rCache 222, the data in the rCache 222 becomes "dirty" if new data is written to the address(0) 242. In this event, the method 600 proceeds to block 615 where the "dirty" data in the rCache 222 associated with the address(0) 242 is deleted from the rCache 222.

If the determination at block 614 is that no entry in the rCache 222 is associated with the address 242 in the flash memory 240 to which data will be written, the method 600 returns to wait for the next access request to the flash memory (block 610). In the exemplary embodiment of FIG. 6A, the determination in block 614 is a separate determination of block 612. In other embodiments (not illustrated), the determinations of blocks 612 and 614 may be combined into a single determination step or block. Additionally, in the illustrated method 600, the rCache controller 220 does not cause a prefetch of information to the rCache 222 if the access request of block 610 is to write information to the flash memory 240. In other embodiments, if the access request of block 610 is to write information to the flash memory 240, the rCache controller 220 may cause a prefetch of information to the rCache 222, and such prefetch may be in accordance to one or more of the blocks illustrated in FIG. 5A.

Returning to block 612, if the determination is that the access request to the flash memory 240 is not a write request—i.e. a component such as CPU 210 is reading information from the flash memory 240—the method continues to block 616 where a determination is made (similar to block 614 using a CAM) whether any prefetched data in the rCache 222 is "used" such as to response to the read request to the flash memory 240 (see blocks 514-515 of FIG. 5A). If a prefetched data or page of rCache 222 is "used" by the CPU 210 or other component of the system 200, it may be placed into another memory such as the DRAM 230 or file cache 231 of the DRAM 230. In this event, there is no need to additionally maintain the data or page as part of the prefetched data stored or buffered in rCache 222, and the "used" data is removed from the rCache 222 in block 617.

After the "used" data is removed from the rCache 222 in block 617, or if the determination in block 616 is that none of the data in the rCache 222 is "used," the method proceeds to block 618. In block 618, a determination is made whether a current prefetch will cause the rCache 222 to overflow. In the embodiment illustrated in FIGS. 2-3, the rCache 222 is a fixed-sized memory. Block 618 provides a mechanism or way to ensure that the rCache 222 does not overflow from successive read requests to the flash memory 240 and accompanying prefetches that accompany the read requests (see blocks 518-527 of FIG. 5A). In an embodiment, the rCache controller 220 may make this determination, such as at any of blocks 516, 518, 522, 524, or 526 of method 500 illustrated in FIG. 5A. In another embodiment, block 618 may be optional, such that no separate determination of an rCache 222 overflow is made. In such alternative embodiments, each new successive prefetch may automatically overwrite the oldest "unused" data stored in the rCache 222, without the separate determination of block 618.

If the determination in block 618 is that the current prefetch will cause the rCache 222 to overflow, the method proceeds to block 620 where any "overage" data entries or pages in the rCache 222 are deleted. As discussed above, the pages or data entries of the rCache 222 may have one or more counter tracking how long the page(s) or data entry (entries) have been stored in the rCache 222. The counters may be part of the rCache 222 in some embodiments. Deletion of the "overage" data entries in block 620 may comprise just deleting the "oldest" pages/data entries—i.e. the unused pages/data entries that have been stored in the rCache 222 the longest—until there is sufficient space on the rCache 222 to store the current prefetch. In other embodiments, block 620 may comprise deleting all pages/data entries that have been stored in the rCache 222 more than a threshold time period.

After the overage rCache 222 pages/data entries are deleted in block 620, or if the determination in block 618 is that the current prefetch will not cause the rCache 222 to overflow, the method 600 continues to block 619 where the counter(s) associated with the pages/data entries of the rCache 222 are incremented or updated. In block 619 the rCache 222 may itself increment the counters, or the rCache controller 220 may cause any counters for previously existing pages/data entries to increment. Additionally, block 619 may further comprise beginning counters for newly stored pages/data entries in the rCache 222 from the current prefetch, and for resetting counters associated with deleted pages resulting from block 615, 617, and 620. It should also be understood that the action of deleting pages will also clear any hardware references—such as entries in content addressable memory—associated with the deleted page. The method 600 then returns to wait for the next access request to the flash memory 240 in block 610.

As would be understood, FIGS. 5A and 6A describe only one exemplary embodiment of the disclosed methods 500 and 600, respectively. In other embodiments, additional blocks or steps may be added to the method 500 illustrated in FIG. 5A and/or method 600 illustrated in FIG. 6A. Similarly, in some embodiments various blocks or steps shown in FIGS. 5A and/or 6A may be combined or omitted as discussed above. Such variations of the methods 500 and 600 are within the scope of this disclosure.

Additionally, certain steps in the processes or process flows described in this specification, including FIGS. 5A or 6A may naturally precede others for the methods 500 and 600 to function in the described embodiments. However, the disclosure is not limited to the order of the steps described if such order or sequence does not alter the functionality. Moreover, it is recognized that some steps may performed before, after, or in parallel (substantially simultaneously) with other steps without departing from the scope of the disclosure. Further, words such as "thereafter", "then", "next", "subsequently", etc. are not intended to limit the order of the steps. These words are simply used to guide the reader through the description of the exemplary method.

Figure 5B:
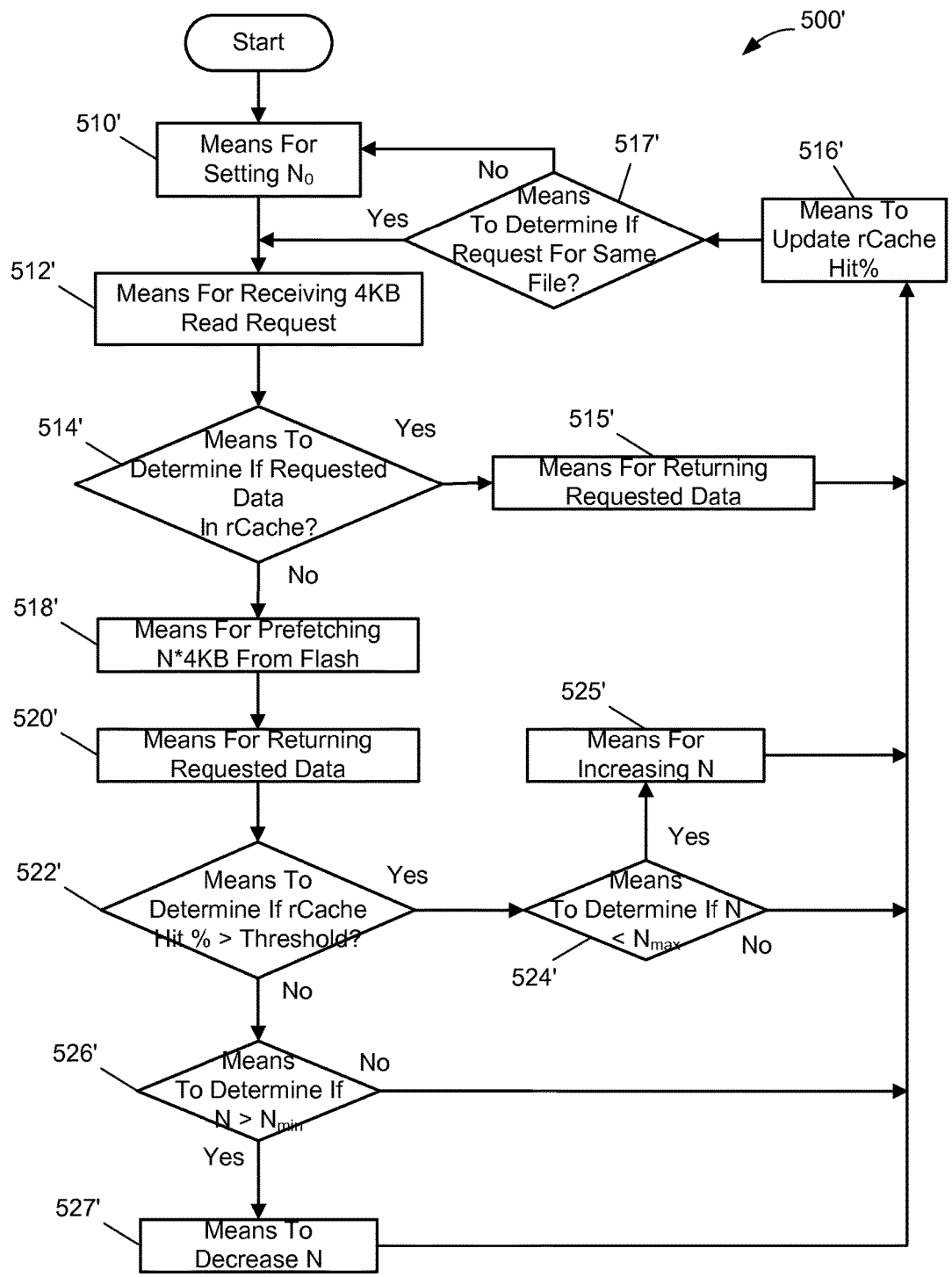
FIG. 5B illustrates example components capable of performing the method illustrated in FIG. 5A.
Figure 6B:
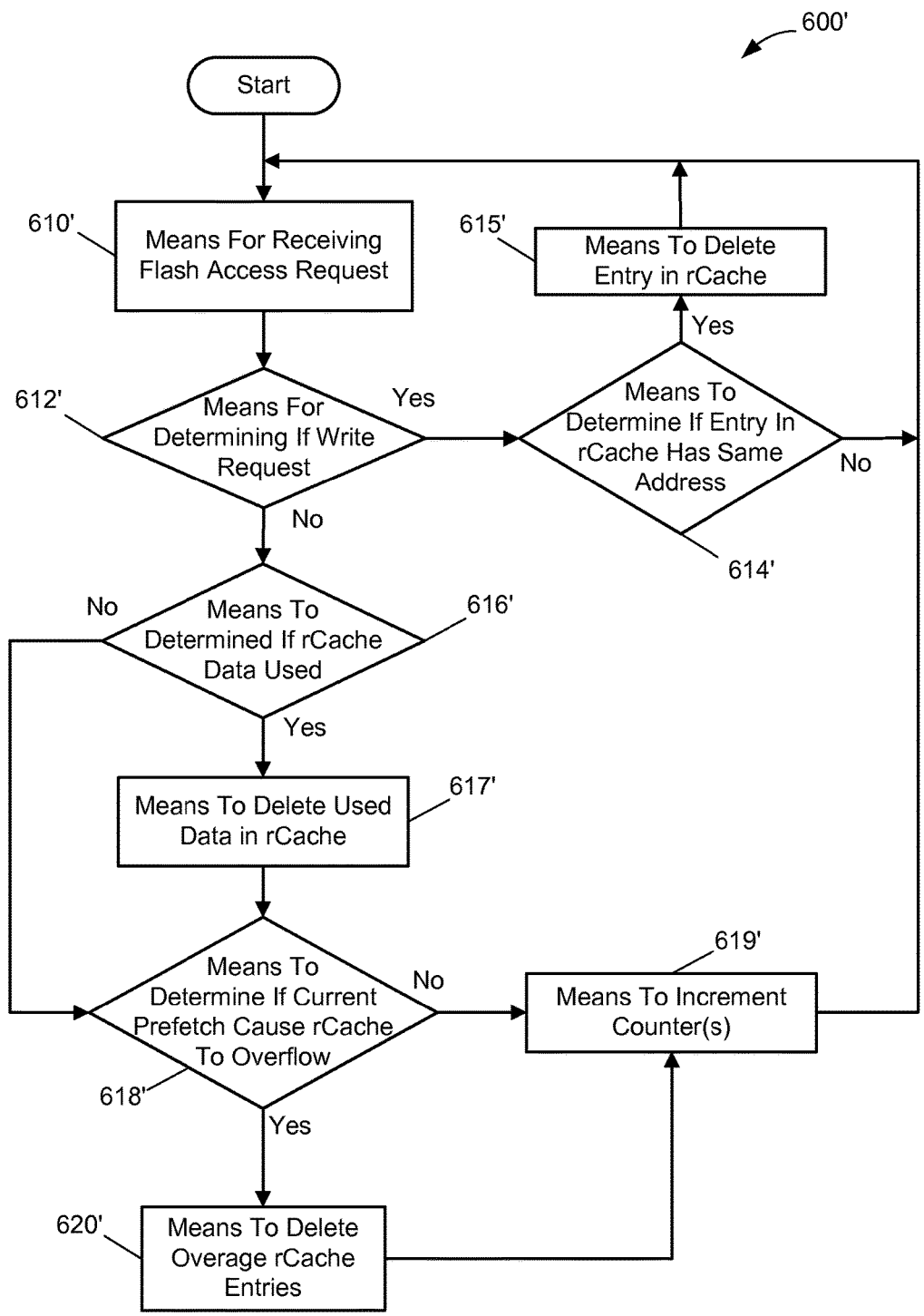
FIG. 6B illustrates example components capable of performing the method illustrated in FIG. 6A.

The various operations, methods, or functions described above for methods 500 and 600 may be performed by various hardware and/or software component(s)/module(s). Such component(s) and/or module(s) may provide the means to perform the various described operations, methods, or functions. Generally, where there are methods illustrated in Figures having corresponding counterpart means-plus-function Figures, the operation blocks correspond to means-plus-function blocks with similar numbering. For example, blocks 510-527 illustrated in FIG. 5A correspond to means-plus-function blocks 510'-527' illustrated in FIG. 5B. Similarly, blocks 610-620 illustrated in FIG. 6A correspond to means-plus-function blocks 610'-620' illustrated in FIG. 6B.

One of ordinary skill in programming is able to write computer code or identify appropriate hardware and/or circuits to implement the disclosed invention without difficulty based on the flow charts and associated description in this specification, for example. Therefore, disclosure of a particular set of program code instructions or detailed hardware devices is not considered necessary for an adequate understanding of how to make and use the invention. The inventive functionality of the claimed processor-enabled processes is explained in more detail in the above description and in conjunction with the drawings, which may illustrate various process flows.

In one or more exemplary aspects as indicated above, the functions described may be implemented in hardware, software, firmware, or any combination thereof. If implemented in software, the functions may be stored on or transmitted as one or more instructions or code on a computer-readable medium, such as a non-transitory processor-readable medium. Computer-readable media include both data storage media and communication media including any medium that facilitates transfer of a program from one location to another.

A storage media may be any available media that may be accessed by a computer or a processor. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of non-transitory computer-readable media.

Although selected aspects have been illustrated and described in detail, it will be understood that various substitutions and alterations may be made herein without departing from the present invention, as defined by the following claims.

What is claimed is:

1. A method for improved flash memory performance in a portable computing device (PCD), the method comprising:
   determining a value N corresponding to an amount of prefetch data to be retrieved from the flash memory;
   receiving at a cache controller in communication with a cache memory an access request for a flash memory;
   determining whether the access request for the flash memory corresponds to a portion of data stored in the cache memory;
   returning the portion of data stored in the cache memory in response to the request to access the flash memory if the access request for the flash memory corresponds to the portion of data stored in the cache memory;
   retrieving an N amount of prefetch data from the flash memory, and storing the N amount of prefetch data in the cache memory if the access request for the flash memory does not correspond to the portion of data stored in the cache memory;

incrementing the value N based on a cache hit percentage for the cache memory by determining that the cache hit percentage is above a threshold value and increasing the value N if N is less than a maximum value $N_{max}$; and determining whether prefetch data of the N amount of prefetch data is used by a processor or other components in the PCD, moving the prefetch data from the cache memory and placing the prefetched data in a file cache if the prefetch data is used by the processor or the other components, and simultaneously determining if the retrieving of the N amount of prefetch data causing overlow in the cache memory, and automatically overwriting oldest unused data stored in the cache memory.

2. The method of claim 1, wherein the value N represents a number of 4 kilobyte data blocks in the flash memory.

3. The method of claim 1, wherein receiving the access request for a flash memory comprises receiving a read request from a processor in communication with the cache controller and the flash memory.

4. The method of claim 3, wherein the cache controller is a hardware device separate from the processor.

5. The method of claim 1, wherein incrementing the value N based on the cache hit percentage further comprises:
determining that the cache hit percentage is below the threshold value and decreasing the value N if N is greater than a minimum value $N_{min}$.

6. The method of claim 5, further comprising:
updating the cache hit percentage in response to the access request for the flash memory.

7. The method of claim 1, wherein returning the portion of data stored in the cache memory in response to the request to access the flash memory if the access request for the flash memory corresponds to data stored in the cache memory further comprises:
deleting the portion of data from the cache memory.

8. A computer system for a system-on-a-chip (SoC) in a portable computing device (PCD), the system comprising:
a processor of the SoC;
a cache controller of the SoC;
a cache memory in communication with the cache controller and the processor; and
a flash memory in communication with the cache controller, wherein the cache controller configured to:
determine a value N corresponding to corresponding to an amount of prefetch data to be retrieved from the flash memory,
receive from another component of the SoC an access request for a flash memory,
determine whether the access request for the flash memory corresponds to a portion of data stored in the cache memory,
return the portion of data stored in the cache memory in response to the request to access the flash memory if the access request for the flash memory corresponds to the portion of data stored in the cache memory,
retrieve an N amount of prefetch data from the flash memory, and store the Namount of prefetch data in the cache memory if the access request for the flash memory does not correspond to the portion of data stored in the cache memory,
increment the value N based on a cache hit percentage for the cache memory by determining that the cache hit percentage is above a threshold value, and increasing the value N if N is less than a maximum value $N_{max}$, and determine whether prefetch data of the N amount of prefetch data is used by a processor or other components in the PCD, move the prefetch data from the cache memory and placing the prefetched data in a file cache of the SoC if the prefetch data is used by the processor or the other components, and simultaneously determine if the retrieve of the N amount of prefetch data causing overlow in the cache memory, and automatically overwrite oldest unused data stored in the cache memory.

9. The system of claim 8, wherein the value N represents a number of 4 kilobyte data blocks in the flash memory.

10. The system of claim 8, further comprising:
a processor of the SoC in communication with the cache controller, the processor configured to send a read request for data on the flash memory to the cache controller.

11. The system of claim 10, wherein the cache controller is a hardware device on the SoC separate from the processor.

12. The system of claim 8, wherein the cache controller configured to increment the value N based on a cache hit percentage for the cache memory, further comprises the cache controller configured to:
determine that the cache hit percentage is below the threshold value, and
decrease the value N if N is greater than a minimum value $N_{min}$.

13. The system of claim 12, wherein the cache controller is further configured to:
update the cache hit percentage in response to the access request for the flash memory.

14. The system of claim 8, wherein the cache controller is further configured to:
delete the portion of data from the cache memory if the access request for the flash memory corresponds to data stored in the cache memory.

15. A computer program product comprising a non-transitory computer usable medium having a computer readable program code embodied therein, said computer readable program code adapted to be executed to implement a method for improved flash memory performance in a portable computing device (PCD), the method comprising:
determining a value N corresponding to an amount of prefetch data to be retrieved from the flash memory;
receiving at a cache controller in communication with a cache memory an access request for a flash memory;
determining whether the access request for the flash memory corresponds to a portion of data stored in the cache memory;
returning the portion of data stored in the cache memory in response to the request to access the flash memory if the access request for the flash memory corresponds to the portion of data stored in the cache memory;
retrieving an N amount of prefetch data from the flash memory, and storing the N amount of prefetch data in the cache memory if the access request for the flash memory does not correspond to the portion of data stored in the cache memory;
incrementing the value N based on a cache hit percentage for the cache memory, wherein incrementing the value comprises determining that the cache hit percentage is above a threshold value and increasing the value N if N is less than a maximum value $N_{max}$; and
determining whether prefetch data of the N amount of prefetch data is used by a processor or other components in the PCD, moving the prefetch data from the cache memory and placing the prefetched data in a file cache if the prefetch data is used by the processor or the other components, and simultaneously determining if the retrieving of the N amount of prefetch data causing overlow in the cache memory, and automatically overwriting oldest unused data stored in the cache memory.

16. The computer program product of claim 15, wherein the value N represents a number of 4 kilobyte data blocks in the flash memory.

17. The computer program product of claim 15, wherein receiving the access request for a flash memory comprises receiving a read request from a processor in communication with the cache controller.

18. The computer program product of claim 17, wherein the cache controller is a hardware device separate from the processor.

19. The computer program product of claim 15, wherein incrementing the value N based on the cache hit percentage further comprises:
  determining that the cache hit percentage is below the threshold value and decreasing the value N if N is greater than a minimum value $N_{min}$.

20. The computer program product of claim 19, further comprising:
  updating the cache hit percentage in response to the access request for the flash memory.

21. A computer system for improved flash memory performance in a portable computing device (PCD), the system comprising:
  means for determining a value N corresponding to an amount of prefetch data to be retrieved from the flash memory;
  means for receiving at a cache controller in communication with a cache memory an access request for a flash memory;
  means for determining whether the access request for the flash memory corresponds to a portion of data stored in the cache memory;
  means for returning the portion of data stored in the cache memory in response to the request to access the flash memory if the access request for the flash memory corresponds to the portion of data stored in the cache memory;
  means for retrieving an N amount of prefetch data from the flash memory, and storing the N amount of prefetch data in the cache memory if the access request for the flash memory does not correspond to the portion of data stored in the cache memory;
  means for incrementing the value N based on a cache hit percentage for the cache memory, wherein the means for incrementing comprises means for determining that the cache hit percentage is above a threshold value, and means for increasing the value N if N is less than a maximum value $N_{max}$; and
  means for determining whether prefetch data of the N amount of prefetch data is used by a processor or other components in the PCD, means for moving the prefetch data from the cache memory and placing the prefetched data in a file cache if the prefetch data is used by the processor or the other components, and simultaneously determining if said means for retrieving of the N amount of prefetch data causing overlow in the cache memory, and means for automatically overwriting oldest unused data stored in the cache memory.

22. The system of claim 21, wherein the value N represents a number of 4 kilobyte data blocks in the flash memory.

23. The system of claim 21, wherein the means for receiving the access request for a flash memory further comprises:
  means for receiving a read request from a processor in communication with the cache controller.

24. The system of claim 23, wherein the cache controller is a hardware device separate from the processor.

25. The system of claim 21, wherein the means for incrementing the value N based on the cache hit percentage further comprises:
  means for determining that the cache hit percentage is below the threshold value, and
  means for decreasing the value N if N is greater than a minimum value $N_{min}$.

26. The system of claim 25, further comprising:
  means for updating the cache hit percentage in response to the access request for the flash memory.

* * * * *